United States Patent [19]

Cooper et al.

[11] 4,326,259
[45] Apr. 20, 1982

[54] SELF ORGANIZING GENERAL PATTERN CLASS SEPARATOR AND IDENTIFIER

[75] Inventors: Leon N. Cooper; Charles Elbaum; Douglas L. Reilly, all of Providence, R.I.

[73] Assignee: Nestor Associates, Stonington, Conn.

[21] Appl. No.: 134,571

[22] Filed: Mar. 27, 1980

[51] Int. Cl.³ .......................................... G06F 15/18
[52] U.S. Cl. .............................. 364/715; 340/146.3 T; 364/900
[58] Field of Search .............................. 364/715, 900; 340/146.3 T, 146.3 Z

[56] References Cited

U.S. PATENT DOCUMENTS

| | | | |
|---|---|---|---|
| 3,601,811 | 8/1971 | Yoshino | 364/900 |
| 3,638,196 | 1/1972 | Nishiyama et al. | 364/900 |
| 3,810,162 | 5/1974 | Ewing, Jr. et al. | 340/146.3 T |
| 3,950,733 | 4/1976 | Cooper et al. | 364/900 |
| 4,044,243 | 9/1977 | Cooper et al. | 364/715 |

*Primary Examiner*—David H. Malzahn
*Attorney, Agent, or Firm*—Karl F. Milde, Jr.

[57] ABSTRACT

A system is provided for the separation into and the indentification of classes of events wherein each of the events is represented by a signal vector comprising the signals s, $s_z$ ..., $s_j$ ..., $s_N$. The system comprises a plurality of assemblies, each of the assemblies including a matrix of junction elements for respectively receiving as inputs the different respective signals of a vector. The junction elements provide a transfer of information $A_{ij}s$, i.e., the product of the transfer function of the element and the signal input applied thereto. The information transferred by the junction elements is summed in each assembly. In the training mode of operation information summed in each assembly is applied to a scalar multiplier and the resulting information is in turn applied to a threshold stage which is actuated to produce an output if the input applied thereto attains a prescribed value. Concurrently, the summed outputs of the junction elements are fed back to these elements to modify their transfer functions. The outputs of the threshold stages are finally processed for identification of the classes of events.

28 Claims, 9 Drawing Figures

SELF ORGANIZING GENERAL PATTERN CLASS SEPARATOR AND IDENTIFIER

FIELD OF THE INVENTION

This invention relates to adaptive information processing systems. More particularly it relates to self-organizing input-output devices which function to separate and identify classes of information that are not necessarily linearly separable.

BACKGROUND OF THE INVENTION

Linear input-output devices which are operative to separate and identify classes of information divide the pattern space into two or more regions by constructing lines, planes or hyperplanes. Combinations of such devices in series and/or parallel, if properly adjusted, can separate classes in a piece-wise linear fashion. However, in the absence of a general learning procedure, the proper adjustments for separating various classes must be developed for each case.

Accordingly, it is an important object of this invention to provide an information processing system which can self-organize itself so as to separate and identify an arbitrary number of classes in a space of arbitrary dimensionality.

It is another object to provide a self-organizing information processing system which is capable of separating and identifying classes which are not linearly separable and which is not dependent upon the extent of clustering of classes.

It is a further object to provide a self-organizing information processing system as set forth in the preceding objects wherein it is not required to write software programs for each situation.

SUMMARY OF THE INVENTION

Generally speaking and in accordance with the invention, there is provided a system for the separation into and the identification of classes of events wherein each of the events is represented by a signal vector comprising the signals, $s_1, s_2 \ldots, s_j \ldots, s_N$. The system comprises a plurality of input terminals adapted to receive these signal vectors and a plurality of assemblies connected thereto. The assemblies each comprise a plurality of junction elements, each of these elements being connected to an input terminal and providing a transfer of information in dependence upon a signal $s_j$ appearing at the input j and upon the transfer function $A_{ij}$ of the element. A summing device is included in each assembly for summing the information transferred by the junction elements.

In the training mode of the system operation according to the invention, the output of the summing device is fed back as an input to the junction elements to vary the transfer function of these elements.

A salient component of the invention is the provision of means for modifying the output of the summing means when the system is operated in the training mode. In particular, the output of the summing means is modified such as by multiplication by a chosen scalar factor, the factor being adapted to be variable in accordance with observed events in the training mode of operation. The output produced by the modifying means is tested in a threshold determining stage to ascertain whether such output attains a prescribed value, the threshold stage being actuated to produce an output when the prescribed value is attained. The attaining of an output from a threshold stage indicates the recognition by the system of an event.

The identification portion of the system essentially comprises means responsive to the outputs of the various threshold stages for producing outputs which represent groups of events representing distinct classes. This last-named means includes a plurality of class output means, each of the class output means being selectable to produce an output indicating the occurrence of events falling within a single class. Associated with each class output means are means operative to selectively activate a class output means. Means are provided, responsive to the concurrent activation of a selective activating means and an output from a threshold stage, for causing the production of outputs from an activated class output means.

Means are provided, respectively associated with each class output means and activated in response to the production of an output from a selected class output means, for enabling the switching into activation of the last-named class output means without the need for operation of its associated activating means. With this arrangement a class output means which has been activated but is currently deactivated can still produce outputs.

As has been mentioned, the summing device output modifying means is a salient element of the invention. To this end there are included in the system for use in the training mode of operation, means responsive to the occurrence of outputs which are not desired as outputs from the currently activated class output means, for selectively feeding back such undesired outputs to those modifying means whose associated threshold means had produced the undesired outputs to change the value of the modifying factor in the last-named modifying means.

Suitably the modifying means is a scalar multiplier and the above described feedback lowers the value of its multiplication factor. Such lowering may be of the analog type or the multiplication factor may be decremented by a selected value at each occurrence of feedback thereto.

As has been mentioned, feedback is also provided in the training mode of operation from the output of each summing device to the inputs of the junction elements. The transfer function of a junction element, in an illustrative embodiment, may be $A_{ij}s_j$ wherein $s_j$ is the signal applied at its input. The feedback modifies the value of this transfer function.

To summarize the above, in the training mode of operation the system is trained to separate and identify classes of events and to have its values modified to the point where errors of separation and identification are substantially eliminated, such elimination being effected by the feedback arrangements for modifying the values of the transfer functions of the junction elements and the values of the multiplication factors of the modifying means.

Once the system has been trained to recognize a particular group of related classes of events, it can now be employed in the "trained" mode of operation. In this mode, the feedback is removed between the outputs of the summing devices and the inputs of their associated junction elements so that the transfer functions are no longer modified.

The modifying means in each assembly is also eliminated or rendered inoperative and the prescribed threshold value of its associated threshold stage is adjusted so that the threshold is exceeded by the same output value of the respective summing device. Thus, in the "trained" mode of operation for the recognition and separation of a particular group of related classes of events, the pertinent circuit parameters have attained fixed values corresponding to the final values attained during training. Further in this trained mode of operation, no use is made of the feedback arrangements from the class output means to the modifying means and all of the class output means can be activated concurrently.

DESCRIPTION OF THE PREFERRED EMBODIMENT

Figure 1:
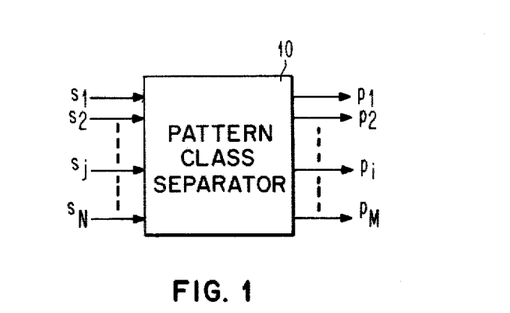
FIG. 1 is a conceptual depiction of a pattern class separator constructed according to the principles of the invention.

Referring now to FIG. 1, the block 10, legended "pattern class separator," comprises a plurality of input terminals for receiving N input signals, $s_1 s_2 \ldots, s_j \ldots s_N$ and a plurality of output terminals for providing M output responses $p_1 p_2 \ldots, p_i \ldots, p_M$. This device functions to separate incoming patterns into their respective classes. This is accomplished by creating a number of "prototypes" in the manner explained below.

According to the invention the pattern class separator may be operated in a "training mode" in which prototypes are formed and modified, and in a "trained mode" in which no training modifications are made to the system.

In the operation of this pattern class separator there can be considered a situation in which there are K external classes to be separated and, of course, thereafter identified. For example, the K classes may constitute the ten Arabic numerals 0–9 and the twenty-six upper and lower case letters A–Z of the Roman alphabet wherein each number or letter constitutes a separate class. However, as is readily appreciated, there can be many graphic depictions of a particular letter or number which differ greatly from each other graphically although their common identity is readily perceived by human intelligence. Hence, even a simple graphic structure such as the Arabic numeral "7" can be written in many ways and yet be correctly recognizable by a human reader.

The pattern class separator of FIG. 1 receives as inputs the representatives of the various different classes. These representatives, before being fed to the pattern class separator are first coded into signals $s_1, s_2 \ldots, s_j \ldots s_N$ by means of an initial coding scheme which, is designed to preserve information but to remove obvious irrelevant features. In this latter connection, clearly, the better the coding, the easier the class separation but, in accordance with the invention, a rough coding is operative.

After these representatives of the K external classes have been coded in the signal space S, they constitute N-dimensional normalized (unit) vectors in an N-dimensional hyperspace where they form clusters with arbitrary non-linear boundaries. Effectively, with pattern class separator 10, there is achieved the identification of these boundaries whereby the classes are separated without explicit knowledge as to where they are located. This results in the production of outputs $p_1, p_2 \ldots p_i \ldots p_M$. The number of clusters on the N-dimensional space and the number M of outputs will normally be greater than K since each class may include a plurality of such clusters, and each cluster might require more than one output.

Figure 2:
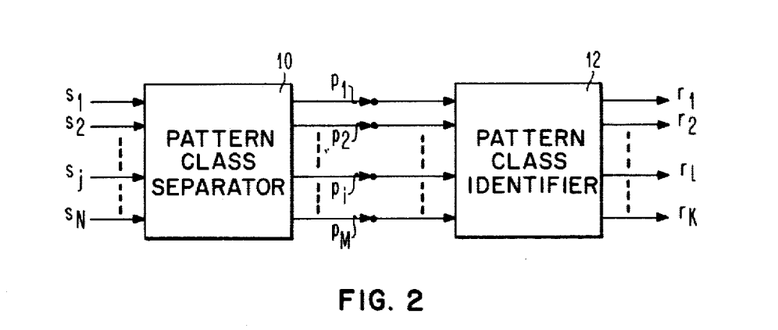
FIG. 2 is a conceptual depiction of the combination of a pattern class separator and a pattern class identifier according to the invention.

In FIG. 2, the outputs $p_1, p_2 \ldots p_i \ldots p_M$ are shown applied to the block 12, legended "pattern class identifier". The outputs of pattern class identifier $r_1, r_2 \ldots, r_I \ldots, r_K$ indicate discrete class identifications. Thus, for example, in the separation and identification of the ten classes constituting the Arabic numerals 0–9, output $r_1$, for example, could be members of the class constituting all the representatives of the Arabic numeral "0".

The respective outputs $p_1, p_2 \ldots p_i \ldots, p_M$ of the pattern class separator indicate the presence of prototypes. Thus, considering again the example using the Arabic numerals 0–9, and assuming that the arrangement as shown in FIG. 2 has presented to it many representatives respectively for each numeral, i.e., each class, then there may be provided as a result of the operation of pattern class separator 10, a number of prototypes for each numeral. (This number can never exceed the number of representatives presented, but is generally very much smaller.)

Figure 3:
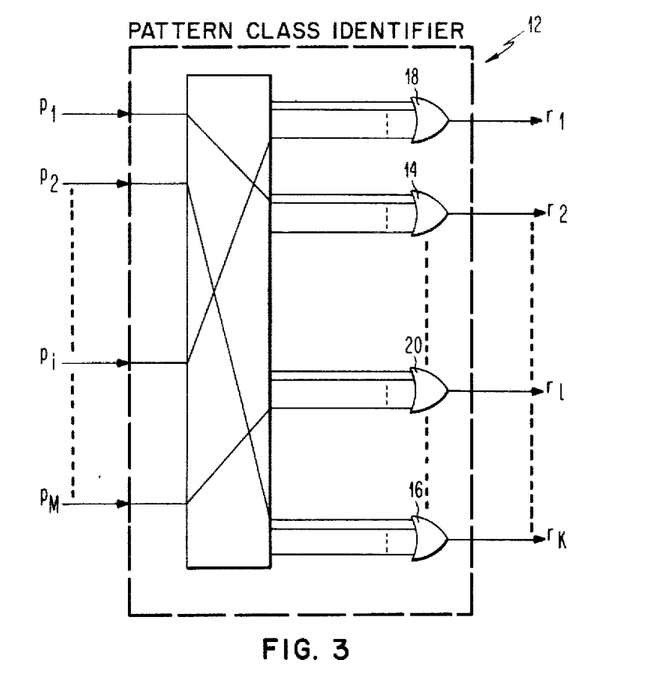
FIG. 3 shows the inputs, outputs and internal connections of the pattern class identifier of FIG. 2.

In FIG. 3, wherein there are shown the functional components of pattern class identifier 12, it is seen that: prototype $p_1$ is applied to a multiple OR circuit 14; prototype $p_2$ is applied to multiple OR circuit 16; prototype $p_i$ is applied to multiple OR circuit 18 and prototype $p_M$ is applied to multiple OR circuit 20. The outputs of circuits 18, 14, 20 and 16 are $r_1, r_2, r_I$ and $r_K$, respectively. Each one of the r outputs thus identifies one of the classes by including all the representatives or prototypes belonging to a single class such as an Arabic numeral where the numerals 0–9 form ten classes.

During the training mode of the pattern class separator, when a pattern comes in in the form of a normalized vector and is not recognized, i.e. is not declared "like" or "nearly like" a prototype previously stored, it is made into a new prototype. In so doing, the vector representing the pattern (initially of unit length) is "stretched" by multiplication with a positive factor λ

($\lambda > 1$) and thus is given a length greater than unity. The information is contained in the magnitude of the prototype.

A three dimensional space may be considered as a useful example. In this case the incoming patterns are represented by three dimensional vectors of unit length emerging from a common origin, which is also the center of a sphere of unit radius. Each pattern is identified by a point on the sphere, the end point of the radius-vector representing the pattern. Each prototype is also a vector along a radius of the same sphere, but whose length is larger than unity so that a prototype vector extends above the surface of the sphere. Such prototypes may also be represented by circles on the surface of the sphere. The circles are centered on the points of emergence of the prototype vectors on the sphere; the diameters of the circles are proportional to the magnitudes of the vectors. When a prototype is initially committed, it is given a maximum length through multiplication of the incoming pattern of unit length by the positive factor $\lambda°$.

When all the incoming patterns which fall inside the circle of a given prototype belong to this prototype's class, there is no need for further modification. If an incoming pattern of a different class falls inside this circle, the length of the prototype vector is decreased and the diameter of its circle is correspondingly reduced until the incoming pattern no longer falls inside the circle. This incoming pattern may then become a new prototype with its own circle of influence. Initially this circle will be of maximum size (given by $\lambda°$) and eventually it may be reduced by other incoming patterns of different classes.

This process is carried on until the entire population of patterns used for training has been presented to the system (usually several times). The result can be thought of in terms of the geometric analogy of a sphere of unit radius covered with circles of various diameters, each representing the influence region of a prototype. In higher dimensional spaces an analogous situation develops.

Each class of patterns is thus represented by one or more prototypes. The separation into various classes occurs naturally and is independent of the shape of the boundaries between classes. In particular, there is no requirement that the classes be separable by linear elements (i.e. straight lines, planes, hyperplanes) as the shape of the boundary is arbitrary.

After the formation of a suitable "library" (store) of prototypes, all incoming patterns which belong to the classes represented in the library are identified by being matched with a prototype. This procedure can be carried out without further modification of the system, in the so-called "trained mode". The procedure for attempting to recognize an incoming pattern consists of forming the inner (scalar) product between this pattern and all prototypes (which, in principle, is done in parallel). If the inner product equals or exceeds a predetermined value (threshold) the incoming pattern is identified with the class of the corresponding prototype.

During the training mode or learning phase, "recognition" is followed by checking the class of the pattern (known). If the identification is correct, no further action is taken. If the identification is not correct, the magnitude of the prototype is decreased, as described previously. If identification is not made at all a new prototype is added, as discussed below.

The threshold for recognition (minimum value of the inner product) is linked to the value of $\lambda°$, which determines the maximum length of a prototype. In three dimensions, for example, $\lambda°$ determines the maximum diameter of the prototype circle of influence, or equivalently the largest angle of the cone centered on the prototype and thus the incoming patterns furthest removed from the prototype, which can still be identified with this prototype.

Figure 5:
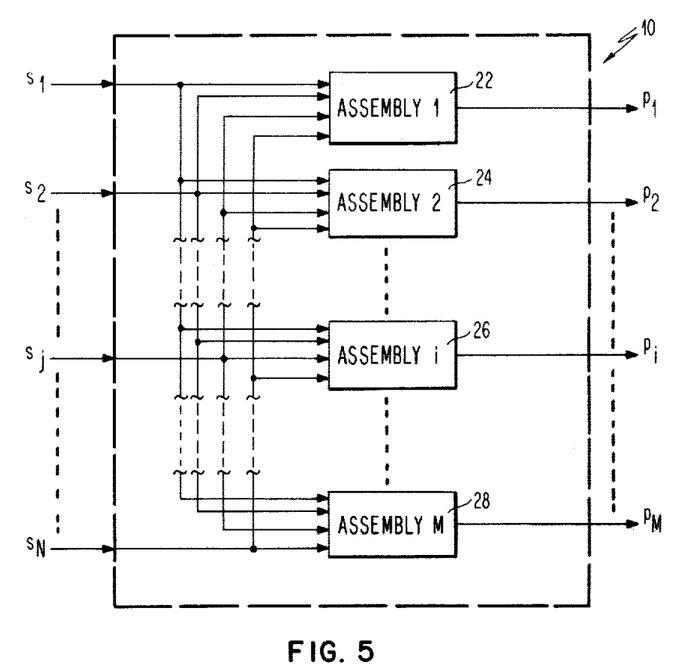
FIG. 5 depicts the inputs, outputs and internal structures of the pattern class separator shown in FIGS. 1, 2 and 4.

Referring now to FIG. 5 there is shown therein the structure constituting pattern class separator 10; in particular, blocks 22, 24, 26 and 28 which represent assembly 1, assembly 2, assembly i and assembly M, respectively. The vector $s_1, s_2 \ldots s_j \ldots, s_N$, which is the signal coding of a single pattern, is shown as commonly applied to all of the assemblies. As shown in this figure, the outputs of assemblies 1, 2 ..., i ..., M produce outputs $p_1, p_2 \ldots p_i \ldots p_M$, respectively.

Figure 7:
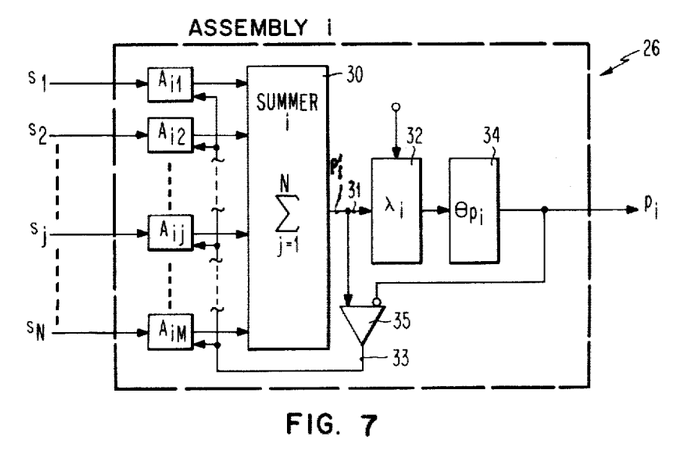
FIG. 7 shows the inputs, outputs and arrangement of internal structures, as shown in FIG. 5, when the pattern class separator is operated in the training mode of operation.

Reference is now made to FIG. 7 wherein there is shown a suitable embodiment of an assembly i of FIG. 5 that is employed according to the invention in its training mode of operation. In this figure, the signals of the input vector $s_1, s_2 \ldots, s_j \ldots, s_M$ are shown applied to a matrix of weighting stages $A_{i1}, A_{i2} \ldots, A_{ij} \ldots, A_{iM}$. The first subscript of an A stage is the same as its assembly descriptor. The second subscript is the designator of the particular A stage within a given assembly. The members of the A matrix are junction elements, each element effecting a transfer of information from its input terminal j in dependence upon the signal $s_j$, and upon a "transfer function" $A_{ij}$ of that stage. For example, the transfer function may be a simple multiplication by a stored weighting factor. The matrix of transfer functions—e.g. the weighting factors—may be modified in accordance with a particular algorithm. In U.S. Pat. No. 3,950,733 and 4,044,243, both to Leon N. Cooper and Charles Elbaum and assigned to Nestor Associates, there are disclosed suitable embodiments of an A matrix as employed in an assembly i of FIG. 5 as shown in FIG. 7. In these patents there are also disclosed suitable embodiments of a given stage of the A matrix and termed a mnemonder. The theory of operation of the A matrix is fully explained in these patents and this explanation is incorporated by reference into the instant application.

The outputs of the A matrix are applied to a block 30 or summer i which effects the addition of these outputs and produces an intermediate output $p'_i$ on line 31. The summer may be an operational amplifier connected as a summing circuit in an analog embodiment or a digital adder if the signals are presented in digital form.

As explained in the above-referred-to-patents, the combination of the inputs s, of the A matrix and of a summer is suitably termed a "nouveron" network. A portion of such nouveron is shown in FIG. 12 of the above mentioned U.S. Pat. No. 3,950,733 and the explanation of its operation is incorporated by reference into the instant application.

Referring back to FIG. 7 of the instant application, it is seen thereby that the output $p'_i$ of summer i is fed back to the components of the A matrix through a controllable element 35. Element 35 may be suitably of the operational amplifier type and has an inhibit input to which is applied the output of stage 34, i.e., $\theta p_i$, as is further explained hereinbelow whereby the transfer functions are modified. Element 35 may also be a gate, such as an AND gate followed by an inverter. Such operation is disclosed in the aforementioned patents and the explanation in connection with such disclosure is incorporated by referenced into this application. Suffice it to say that the transfer functions are modified in accordance with the algorithm:

$$A_{ij}(t) = A_{ij}(t-1) + \delta A_{ij}(t)$$

where $\delta A_{ij}(t)$ has the form:

$$\delta A_{ij}(t) = \eta p'_i s_j \text{ and,}$$

where $\eta$ is a learning parameter.

The output $p'_i$ of summer i on line 31 is applied to a stage 32 legended $\lambda_i$ which may suitably be a scalar multiplication unit. In the $\lambda$ unit the output of the summer is multiplied by a chosen factor. The result of such multiplication is applied to a following stage 34 legended $\theta p_i$.

The $\theta_{pi}$ stage functions as a threshold device. In other words if the output of the $\lambda$ stage equals or exceeds a chosen level, the $\theta$ stage is actuated. In this connection, a $\theta$ stage may suitably be a circuit element, such as a Schmitt trigger in an analog embodiment, or a corresponding digital element, which produces an output if the input applied thereto attains the aforementioned level.

As will be further explained hereinbelow, in the further description of the operation of the combination of the $\lambda$ and $\theta$ stages, the $\lambda$ stage is utilized, according to the invention, when the system is in the training mode.

As has been mentioned, the output of stage $\theta_{pi}$ is applied as an inhibit input to element 35. Element 35 is constructed to pass the signal $p_i'$ from its input to its output when there is no occurrence of a $p_i$ output resulting from the actuation of threshold stage $\theta_{pi}$. This structure is provided to prevent the modification of the transfer functions of the A matrix when a $\theta_{pi}$ stage is actuated, after the formation of a prototype has been completed.

Figure 8:
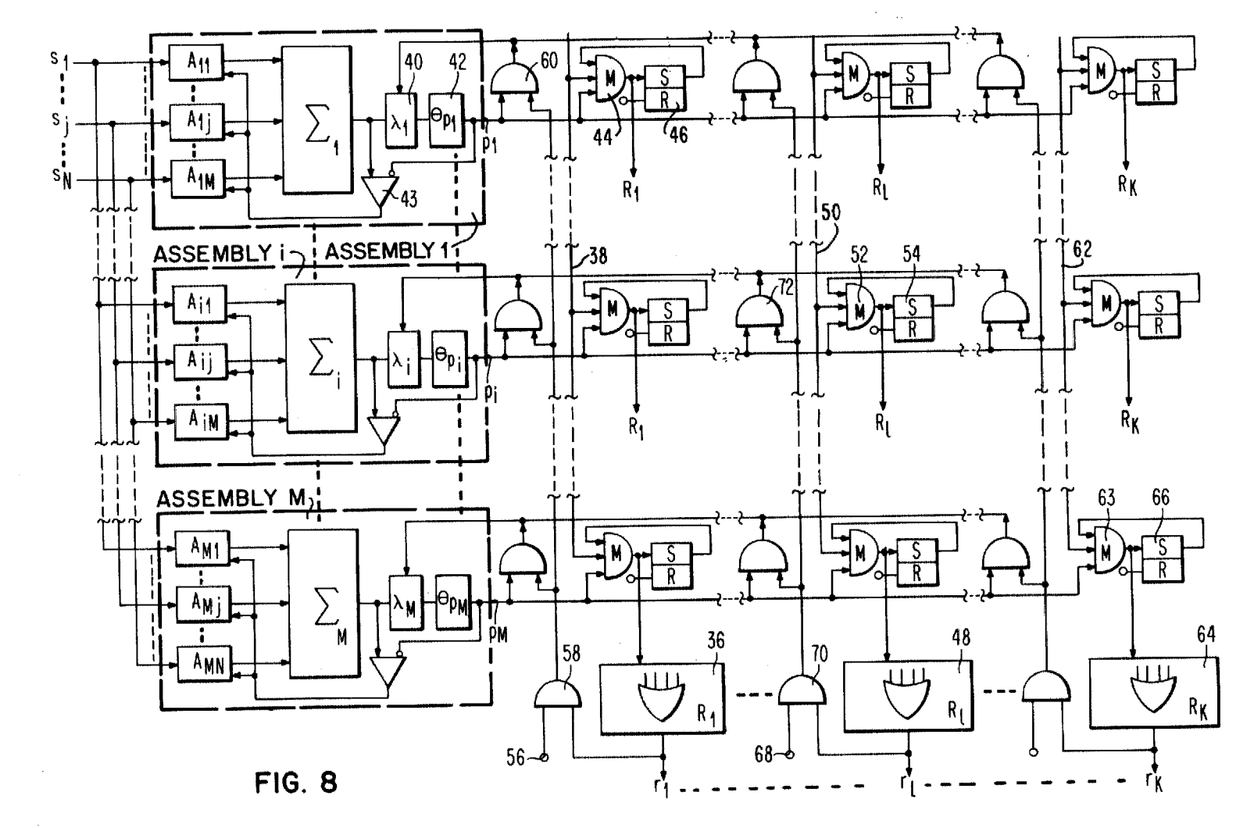
FIG. 8 is a diagram of an illustrative embodiment of the combination of the pattern class separator and pattern class identifier, as shown in FIG. 2, when such combination is operated in the training mode of operation.

Reference is now made to FIG. 8 which depicts an illustrative embodiment of a system constructed according to the principles of the invention. In this system, there is shown at the left side of FIG. 8 assembly 1 . . . , assembly i . . . , assembly M, each assembly having the structure of assembly 26 as disclosed in FIG. 7. Thus, the assembly in the top row of FIG. 8 comprises the A matrix $A_{11} \ldots, A_{1j} \ldots A_{1M}$, summer $\Sigma_1$, lambda stage $\lambda_1$, and threshold stage $\theta p_1$. Correspondingly, the assembly in the middle row comprises like stages designated with the subscript i and the assembly in the bottom row comprises like stages designated with the subscript M.

In FIG. 8 it is seen that the signal vector $s_1 \ldots, s_j \ldots, s_N$ is applied to all of the assemblies. The signals constituting the vector characterize an event. This can be an optical event such as the sight of a pattern, an auditory event such as the hearing of the tone, etc. The only requirement for the event is that it be translatable into a plurality of input signals which retain sufficient detail about the event to permit separation and identification. The signals constituting the vector are generated by a translator which performs some form of analysis of the event and produces signals in response to this analysis. For example, (as described in the above referenced U.S. Pat. No. 3,950,733) the translator may divide a visual scene into raster elements, perform a Fourier analysis of auditory information, etc. Such translators are well known in the art and no detailed description thereof is deemed necessary.

The applied signal vector is accordingly processed in each assembly as set forth in connection with the description of the structure and operation of the assembly of FIG. 7.

Let it be assumed that it is desired to utilize the system shown in FIG. 8 for the recognition of the ten Arabic numerals 0 to 9. For convenience of explanation, let it be further assumed that for the purpose of training the system to recognize these numerals, there are available many different graphic forms of each numeral, each of these forms being recognizable to human intelligence as the particular numeral. Thus, it can be stated that it is desired to train the system to separate and identify ten classes, each class being constituted by the many different forms of a single numeral.

Let it be further assumed that, in the training mode of operation, the first signal vector applied to the assemblies of the system results from a translation of a numeral form "0". As mentioned previously, at this initial point of operation the (initial) values of the elements $A_{ij}$ of the A matrix are random and the probability is small of producing an output $p_i$ of the summers, after being multiplied by $\lambda_i^{min}$ (the minimum vaue of the scalar multiplier to which all $\lambda$'s are set initially, that is prior to any training operations) and exceeding the threshold $\theta p_i$. The process of prototype commitment consists of presenting the incoming pattern repeatedly in order to modify the matrix elements $A_{ij}$ according to the Nestor modification of $$\delta A_{ij} = \eta p'_i s_j$$

for each presentation. Eventually, one of the units of the P-bank (including inputs 1 to N, the modified elements of A and a summer) will produce an output sufficient to exceed the threshold $\theta_{pi}$. This unit will thus become committed to the class of the incoming pattern ("0" in this case) and will represent a prototype for "0". Upon completion of this prototype commitment the feedback line 33 (FIG. 7) is disconnected from the output $p'_i$ by means of the element 35 with an inhibit input, and the multiplier $\lambda$ is set to its maximum value $\lambda^\circ$. When this first signal vector is applied and processed as described in connection with the description of operation of the assembly of FIG. 7, it is possible that more than one of the P summers will produce a sufficiently high output to activate their associated threshold($\theta$) stages; only one of these need be chosen for the modification mentioned above.

In the training mode of operation, it is necessary to select a particular output stage R for the identification of a given class. Such selection can be made by a human operator or it can be suitably effected to be automatic. Thus, in the example where it is desired to first separate and identify the "0", the zero class, let it be assumed that the stage R bearing the designated numeral 36 is selected for output. To this end a control line 38 is activated. If it is assumed that the output of the multiplier stage 40, i.e., $\lambda_1$, has been of a level sufficient to actuate the threshold stages 42, i.e. $\theta_{p1}$, to produce output $p_1$, a three-input MAJORITY circuit 44 which is enabled by the appearance of signals on any two of its three inputs has applied thereto: (1) activated control line 38 and (2) the $p_1$ output from threshold stage $\theta_{p1}$. Consequently, the circuit 44 produces an output which is passed to the $R_1$ stage 36 to produce an output $r_1$, stage 36 suitably being a multiple OR circuit. The output of the circuit 44 also sets a flip-flop 46, the permanently set output of flip-flop 46 being fed back as an input to the circuit 44.

For simplicity there is described hereinbelow a sequence in which each class is presented and learned separately. In actual operation this is neither necessary or desirable. The system functions best if representatives of the various classes are intermingled in their presentation.

The training operation suitably continues by consecutively feeding signal vectors designating the members of the various classes, in this example, the class being the numeral "0". During this operation, the transfer functions of the A matrices of the assemblies will be modified until there will be some assemblies for each member of the class whose $\lambda$ stage output will be sufficient to trigger the associated $\theta$ stage to thereby effect the output from the stage $R_1$.

After this class has been separated, control line 38 is deactivated, as permanent connections have been established between each of the units of the P-bank committed to the class under consideration and the corresponding R-unit. Let it be assumed that there are now fed to the system the members of the class of the numeral "6" and that output stage 48, i.e., $R_I$ is selected for the separation of this class. To this end, control line 50 is activated. On feeding to the system the signal vectors, sufficient assemblies not previously committed will be caused to provide outputs at their respective $\lambda$ stages to trigger their associated $\theta$ stages and thereby recognize all of the members constituting the class of numeral "6". If the assembly in the middle row in FIG. 8 is one of these assemblies, then as a result of the multiplication performed by $\lambda_{i}$, threshold stage $\theta_{pi}$ is actuated.

The $p_i$ output and the signal on line 50 consequently enable an AND circuit 52, this MAJORITY circuit being of the same type as the MAJORITY circuit 44. On receipt of an input, a flip-flop 54 is set and its output is fed back as an input to the circuit 52. The output of the circuit 52 is also supplied to the output stage 48, i.e. $R_I$, the output appearing there as output $r_I$.

It is possible that a signal vector representing a member of the class "6" may also produce an output from a stage previously committed to another class, for example, from $\lambda_1$, i.e. stage 40, sufficient to activate the threshold stage 42, i.e. stage $\theta_{p1}$ previously committed to a prototype for a zero. In this situation, the $p_1$ output from $\theta_{p1}$, and the set output from flip-flop 46 will enable the circuit 44 whereby a signal will appear at the output $r_1$ of output stage 36, i.e. $R_1$, which in this example is dedicated to identifying members of the "0" class. This is clearly an undesired occurrence since it introduces an ambiguity into the class separation and identification.

When there is an undesired $r_1$ output, as desired, a voltage is applied to input terminal 56 which is thus actuated and consequently enables an AND circuit 58. The output of AND circuit 58 and the $p_1$ output of $\theta_{p1}$ stage are each applied to an AND circuit 60 which is thus enabled. The output of the AND circuit 60 is then applied to the stage $\lambda_1$. The function of this application to stage $\lambda_1$ is to decrease the value of the multiplication factor of stage $\lambda_1$ by a prescribed amount whereby its output becomes descreased in value. At this point, another presentation is made to the system of the signal vector of the member of class "6" which caused the undesired output $r_1$, with the terminal 56 and the AND circuit 58 deactivated. If an output $r_1$ again appears, the training process is repeated, i.e. enabling the AND circuit 58 so that the value of the multiplication factor of $\lambda_1$ is further decreased. This procedure is continued until an output $r_1$ no longer appears. It is to be understood that for convenience of explanation, the example has been used where only the value of $\lambda_1$ is decreased to avoid an ambiguous class separation and identification. Actually, however, the $\lambda$ stages of any assemblies whose associated flip-flops had been set during the processing of other classes have the values of their multiplication factors decreased in those cases where their associated $\theta$ stages have been actuated incorrectly by the incoming pattern.

At the completion of the processing of the class "6" and with no undesired outputs $r_1$ occurring during such processing, a next class is processed. Let it be assumed that this next class comprises representatives of the numeral "9". To this end, control line 50 is deactivated and a control line 62 is activated. Let it be assumed that the assembly in the bottom row of FIG. 8 is one of those where an output is produced from its threshold stage $\theta_{pM}$ upon application of a signal vector representing a member of class "9" to the system. In this situation, a MAJORITY circuit 63, which is of the same type as the circuits 44 and 52, is enabled by the application thereto of the $p_M$ and line 62 signals. Consequently, a signal is passed through a multiple OR stage 64 to appear as output $r_K$. Concurrently, a flip-flop 66 is set, the set output of this flip-flop 66 being applied as an input to the circuit 63.

It will be appreciated that, at this juncture in the training of the system, those assemblies which normally would have their threshold stages actuated by a member of class "0" have their associated flip-flops set such that there is one input present at their associated 3-input MAJORITY circuits. These same conditions apply in the case of those assemblies whose $\theta$ stages would be actuated by a member of the class "6". Now, in the training of the system to recognize members of the class "9", the operator may therefore also obtain undesired $r_1$ and $R_I$ outputs. In the case of the undesired $r_1$ outputs, the operator activates terminal 56 which brings about the series of events that reduces the value of the multiplication factors of the $\lambda$ stages associated with those assemblies trained to recognize members of class "0". Where there are undesired $r_I$ outputs, the operator activates a terminal 68 thus enabling an AND circuit 70. The $p_i$ output and the output of AND circuit 70 enable an AND circuit 72. The output of AND circuit 72 is fed back to the stage $\lambda_i$ to cause its multiplication factor to be decreased in value, such operation being repeated where necessary. In this manner, at the completion of the training of the system to recognize class "9", with control line 62 active, no further $r_1$ and $r_I$ outputs appear, and the receipt of signal vectors representing members of class "9" appear as $r_K$ outputs. At this stage of the training, therefore, those assemblies which identify members of the classes "0" and "6" have had, if necessary, the multiplication factors of their $\lambda$ stages decreased to the points where no ambiguous recognitions occur.

In the foregoing manner, presentation is made of all of the remaining classes to the system which it is being trained to separate and identify. In this example, it is the numeral class "1", "2", "3", "4", "5", "7", "8".

As described above, as the processing of each class is effected, all undesired r outputs of the classes whose processing has been completed are noted and the values of the multiplication factors of the pertinent λ stages in response to their occurrence, are decreased.

When the processing of all the classes—i.e., the training of the systems—is completed, the values of the A matrices and the multiplication factors of the λ stages will be at levels such that there will be substantially no conflict of separation and identification between separate classes. In this latter connection, considering the example where the classes comprise the ten numerals "0" to "9" and assuming that there are ten members to each class, clearly there are required at least 100 assemblies for proper and complete operation. Actually, there may be required more than 100 assemblies since, during the training period in some cases, the multiplication factors of some λ stages may be reduced to a non-usable level. In the same manner, some of the values of the A matrices may also be modified to such a level. However, with large scale integration, sufficient assemblies and their associated logic and circuit elements (a row of FIG. 8) are readily and cheaply provided.

At the completion of the training of the system to separate and identify the classes of a related group of classes, the system can also be used to separate and identify these classes in the trained mode of operation. When the system is to be utilized in the training mode for another group of related classes, all of the flip-flops are first reset and the control lines are reactivated one by one, in the manner described above, during the operation. In considering the inventive system as described insofar as it relates to the "training mode" of operation, it is convenient to regard it as a three-level system comprising an input or signal bank $S(s_1 \ldots, s_N)$, a first threshold bank $P(p_1 \ldots p_M)$, and a second threshold or response bank, $R(r, \ldots r_k)$. The input bank, S, accepts the initial coded signal. The first threshold bank, P, stores prototypes, while the response bank, R, produces the appropriate responses that identify the separate K classes.

Thus, referring to FIG. 8, the output of the $i^{th}$ summer of the P bank, $p'_i$, is given by the expression $$p'_i = \sum_{j=1}^{N} A_{ij} s_j \quad [1]$$

The scalar multiplication unit $\lambda_i$ multiplies $p'_i$ by the value of the multiplication factor in this unit. The value of $\lambda_i$ varies between a maximum, $\lambda°$, and unity $1 \leq \lambda_i \leq \lambda°$. The output of the $i^{th}$ unit of the P bank after thresholding (the output of assembly i) is then $$p_i = \theta(\lambda_i p'_i) \quad [2]$$

where the threshold function is defined by $$\theta(x) = 1 \quad x \geq 1$$
$$= 0 \quad x < 1$$

With regard to the R bank, as shown in FIG. 8, during the training mode of operation the connections between the P bank and the R-bank are established by the switching to the set states of the flip-flop such as 46, 54 and 66. To generalize the operation of the system, the R bank can be considered as including M summers and M X K "B" elements. In this generalized conception, the output of the $k^{th}$ summer of the R bank is given in general by the expression:

$$r_k' = \sum_{l=1}^{M} B_{kl} P_l \quad [3]$$

while the output of the $k^{th}$ response unit (a stage such as output stages 36, 48 and 64 in FIG. 8) is $$r_k = \theta(r'_k) \quad [4]$$

The embodiment including the flip-flops shown in FIG. 8 is a specific example of one of the various simplifications of the R-bank. This embodiment illustrates the simplification wherein there are employed "On-Off" elements for the $B_{kl}$ term of equation [3]. These elements establish a connection between the outputs of the P-bank and the R-bank when prototypes of classes of events such as pattern classes are being generated.

It is possible to use as an alternative modification form the following:

In the initial configuration the value of the A and B matrices can be set equal to zero; thus there is no response in the P or the R bank to any incoming pattern. The first incoming pattern, $s^i(1)$, (say one in class 1) produces no response in the P bank and therefore no response in the appropriate unit in the R bank, $r^i$. As a consequence the first unit in the P bank is committed to this pattern. The process of committment can be formally represented by adding to the value of the A matrix $$\delta A = p^1 \times s^i(1)$$

where $p^1$ is a unit vector in the P bank $$p_j^1 = \delta_{ij}.$$

setting the value of $\lambda_1$ to its maximum $\lambda^0$ and setting to unity the element between $\theta_1$ and $r^i$, $B_{1i}$.

In considering generally the operation of the system in the "training" mode, i.e. the learning and self-organization mode, the initial values of the elements $A_{ij}$ of the A matrix are random and, most likely, sufficiently small to provide a modest probability of producing an output $p'_i$ of the summers in the P bank and after being multiplied by $\lambda°_i$, exceeding the threshold $\theta_{pi}$. The process of prototype commitment according to the invention consists of presenting the first incoming event—i.e. pattern $s^i(1)$—repeatedly in order to modify, for each presentation, the values of the matrix elements $A_{ij}$ according to the Nestor modification algorithm (as explained in the aforementioned U.S. Pat. No. 3,950,733):

$$\delta A_{ij} = \eta p'_i s_j \quad [5]$$

Eventually, one of the units (assemblies) of the P-bank including inputs 1 to N, the elements A and a summer will produce an output sufficient to attain or exceed the threshold value $\theta_{pi}$. This input will thus become committed to the pattern and its output will represent a prototype $p_i$. When the training and commitment procedure is completed, the element B (a flip-flop) and associated 3-input MAJORITY gate in the embodiment shown in FIG. 8) belonging to the selected final output unit R (one of output stages 36, 48, and 64, for example) is closed; i.e., set. Thus, a connection is established between a unit (assembly) of the P-bank containing the prototype and the final output unit R, which will now respond to incoming patterns that belong to the class represented by this prototype.

If precisely the same pattern, $s^i(1)$ is entered again immediately after the prototype commitment, the response of the $p_1$ unit of the P-bank would be $$p_1 = \theta(\lambda^\circ s^i(1) \cdot s^i(1)) = \lambda^\circ \qquad [6]$$

Since a connection now exists (through a B element such as the flip-flop 46 and associated MAJORITY gate 44 shown in FIG. 8) to an appropriate output stage R, a response $r^i$ is obtained. Thus, the event or pattern would be correctly identified as belonging to the class i. If a second pattern of class i appears, i.e. $s^i(2)$, and $$s^i(2) \cdot s^i(1) > 1/\lambda^\circ \qquad [7]$$

this pattern will be correctly identified by the assembly which produced prototype $p^1$, thereby producing a positive response $r^i$ in the appropriate R bank output stage. No further change is made in the values within the assembly.

If an event—i.e. a pattern of class i—for example $s^i(3)$ appears such that $$s^i(1) \cdot s^i(3) < -1/\lambda_1^\circ, \qquad [8]$$

this will provide no response in the $p_1$ unit and no response $r^i$ and thus will not be identified.

If a pattern of a new class, $s^j(1)$ is entered but does not produce a response in any of the i units already committed to prototypes, a new prototype will be generated.

In the case as illustrated by expression [8], the pattern is again presented repeatedly until another unit of the P-bank will produce an output sufficient to exceed its threshold $\theta$ and a new prototype is formed. Another output stage R is then selected to identify the patterns represented by this prototype. A connection between the P-unit just committed to this prototype and the last-mentioned R unit is established by closing the appropriate element B (setting the appropriate flip-flop in the embodiment shown in FIG. 8).

This process of operation is continued until a sufficient number of prototypes are stored, one such prototype per unit (assembly) of the P-bank. However, not all M units (assemblies) of the P-bank need be committed.

If, however, the event—i.e. pattern $s^j$—did produce a response in, for example, $p_1$(if, for example, $s^1(1) \cdot s^j(1) > 1/\lambda^\circ$) and therefore in output $r^i$, resulting in a misidentification during the learning (training) phase, then the value of $\lambda_1$ is reduced until no response to this incoming pattern in produced in $p_1$ is accordance with:

$$\lambda_1 < (s^1(1) \cdot s^j(1))^{-1} \qquad [9]$$

Once a number of prototypes are committed in the P bank, a subsequent incoming pattern may cause one or more of the following, thereby resulting in the indicated modification. The following may occur:

(1) The new pattern may fall within the region of influence of a prototype of its class and be recognized. In this situation, no modification is required.
(2) The pattern may fall outside the region of influence of any previous prototype of its class. In this case, a new P threshold unit is then committed. The magnitude of the scalar multiplier—i.e. $\lambda$ stage—of this unit (assembly) is set to its maximum $\lambda^\circ$ after committing a pattern. In addition the link between that P unit and the appropriate response unit R is activated (set equal to one). This may occur if no prototypes of the class of the incoming pattern were committed previously or if the incoming pattern falls outside of the region of influence of previously committed prototypes of the appropriate class. If an unknown pattern is not identified by any of the existing prototypes, then it is automatically accepted into the system's P bank as a new prototype unit and assigned the maximum initial scalar multiplier value $\lambda^\circ$. Scalar multipliers of existing prototypes are not enlarged in an effort to include the unknown since, for many of these units, even slightly larger regions of influence have previously resulted in incorrect identification.
(3) The incoming pattern may fall within the region of influence of one or more prototypes belonging to another class. In this case the regions of influence of these prototypes must be reduced (this is done by reducing the values of the appropriate scalar factors $\lambda$) until the incoming pattern no longer produces an output from these threshold units in excess of the threshold for recognition. It is to be understood that the phrase "falls in the region of influence" means that the incoming pattern produces a response in the corresponding P unit in excess of the threshold for recognition. Thus if an input excites a prototype, p, not of the same class, past its actuating threshold, then the magnitude of the multiplier $\lambda$ associated with the prototype is diminished until the unit no longer is actuated. The same effect could, of course, be accomplished by increasing the corresponding threshold, $\theta$.

A particular training set of inputs, consisting of large numbers of events, i.e. patterns in each of K classes (the number of patterns is not necessarily the same for each of the K classes) is preferably presented at least twice. This is because the prototypes committed toward the end of the first presentation may not be tested ("challenged") by enough inputs to reduce their magnitudes to values compatible with the nature (characteristics) of all the inputs.

The overall operation of the system can now be visualized as follows. An entering pattern that is not identified or not correctly identified becomes a prototype, thereby being stored in the A matrix and firing a particular unit in the P bank and the correct response unit for the class in the R bank. Each prototype in the P bank has a certain hypersphere of influence determined by the value of $\lambda$ stored in its scalar multiplication unit. The value of $\lambda$ is reduced every time the prototype responds incorrectly to a signal of the wrong class. It is thus incorrect identifications that shrink the radius of influence of the hypersphere centered at a given prototype.

Many prototypes may be required to map out a difficult boundry or regions of the same class separated by regions of another class. The number of prototypes required is of course dependent on the efficiency of the original code in producing well-separated clusters. However even badly separated regions will eventually be separated and identified by the system.

Although, in the present description, prototypes may sometimes be redundant, it will be evident to those skilled in the art that a variety of modifications may be employed, such as averaging those prototypes which lie within each other's spheres of influence, by which the number of prototypes can be reduced to approach the optimum number or the minimum necessary for satisfactory operation. It is possible to introduce techniques such as inhibition between prototypes of similar classes, excitation between prototypes of different classes and repulsion or attraction between prototypes of different and similar classes. All of these techniques can aid in making the boundaries between classes and reducing the number of necessary prototypes. The system described herein illustrates the basic principles involved in the simplest manner.

Once the system according to the invention has learned to function adequately to a desired performance standard, the learning or training mode is terminated (no further modification) and the system is then operated in the trained mode to separate and identify classes. Thus, with the completion of the training mode of operation wherein the system has been trained to separate patterns into classes and to identify these classes, the system can be employed in the trained mode. To this end, the assemblies may take on the structural arrangement shown in FIG. 6.

Figure 6:
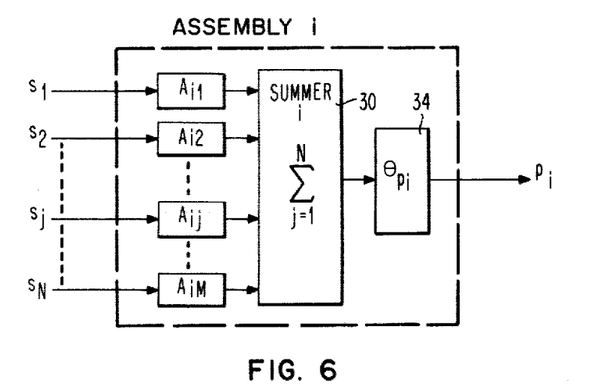
FIG. 6 shows the inputs, outputs and arrangement of internal structures in an assembly, as shown in FIG. 5, when the pattern class separator is operated in the trained mode of operation.

In comparing the assembly structures of FIG. 6 and FIG. 7, it is seen that, in FIG. 6, the output of the summer stage 30 is no longer fed back through element 35 as an input to the junction elements of the A matrix since, in this mode of operation, the final values of the transfer functions of the A matrix have been arrived at through the operation of the system in the training mode. Also in FIG. 6 and different from FIG. 7, there has been eliminated the λ stage since it is no longer necessary to modify the value of the output of the summer.

Correspondingly, in the "trained" mode of operation the only structures in FIG. 8 which are required are the output stages (OR circuit 1) such as stages 36, 48 and 64 and direct connections between the outputs $p_1 \ldots p_i \ldots p_M$, and these respective output stages. The feedback arranged to λ stages, such as AND circuits 58 and 60, are of course eliminated or not used. Flip-flops such as 46, 54 and 66 and associated MAJORITY gates 44, 52 and 63 are also unnecessary in the trained mode of operation since there is no need to look for undesired outputs, i.e. errors in class identification.

Figure 4:
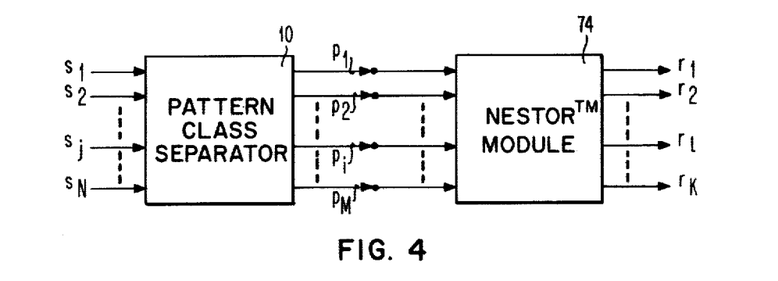
FIG. 4 is a conceptual depiction of the pattern class separator according to the invention in combination with a Nestor TM Module as disclosed in U.S. Pat. No. 3,950,733.
Figure 4A:
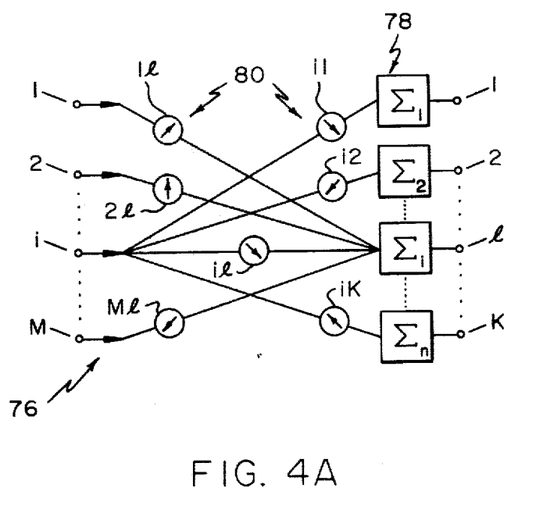
FIG. 4A is a block diagram of the Nestor TM Module which is shown in FIG. 4.

FIG. 4 shows the structure of a pattern class separator 10 connected to a Nestor adaptive module 74 such as shown in FIG. 3 of the above referred to U.S. Pat. No. 3,950,733. In this figure, the assemblies of the pattern class separator 10 have the form shown in FIG. 6, i.e. the structural arrangement employed in the trained mode of operation. The output of the assemblies, viz, $p_1 p_2 \ldots p_i \ldots, p_M$, are applied as inputs to the Nestor adaptive module. In other words the $p_1 p_2 \ldots p_i \ldots, p_M$ outputs of pattern class separator 10 correspond to the $s_1, s_2 \ldots s_j \ldots, s_N$ inputs to the Nestor module as shown in FIG. 3 of the above mentioned patent, which figure is reproduced herein as FIG. 4A. As may be seen, the module comprises M input terminals 76, K summing elements 78 and M×K junction elements 80 connecting each junction element with each one of the summing elements. For a detailed description and explanation of the operation of the Nestor adaptive module, reference is made to this patent.

In considering the operation of the information processing system as described hereinabove, it is to be realized that great flexibility is afforded. Thus, for example, once the system is trained to recognize a group of related classes such as the Arabic numerals 0-9 or the letters of the Roman alphabet A-Z, the final values of the junction elements of the A matrices and the multiplying factors of the λ stages can be stored. Then when it is desired to use the system in the "trained" mode for a group of classes for which it has been previously trained, no retraining is required, it only being necessary to plug in the pertinent stored values of the elements of the A matrices and the λ stages.

Also, it is within the skill of the art to steer the signal vectors to particular assemblies to predetermine which assemblies will have to recognize the members of a chosen class. To this end, initial values of the elements of the A matrices can be pre-chosen to control the course of the training.

There has thus been shown and described a pattern separation and identification system which fulfills all the objects and advantages sought therefore. Many changes, modifications, variations and other uses and applications of the subject invention will, however, become apparent to those skilled in the art after considering this specification and the accompanying drawings which disclose preferred embodiments thereof. For example, while the system has been described as comprising a separate λ multiplication stage and a θ (threshold) stage with a fixed threshold value, it would clearly be possible to combine these two stages into a threshold stage having a modifiable threshold value. Also, systems such as those described above can work in parallel and/or in series to accomplish the stated ends in the most efficient manner. All such changes, modifications, variations and other uses and applications which do not depart from the spirit and scope of the invention are deemed to be covered by the invention which is limited only by the claims which follow.

What is claimed is:

1. An information processing system for separating classes of non-linearly as well as linearly separable patterns, each of said patterns being represented by a plurality N of input signals $s_1, s_2, \ldots s_j \ldots s_N$, said system comprising, in combination:

(a) a plurality N of input terminals, each terminal (j) adapted to receive one of the N input signals ($s_j$);

(b) a plurality M of summing means, each summing means (i) having N inputs and an output and being operative to provide a signal ($p'_i$) at its output representing the sum of the signal representations applied to its inputs;

(c) a plurality N×M of junction elements, each junction element (ij) coupling one of said input terminals (j) with one summing means (i) and providing a transfer of information from the respective input terminal j to the respective summing means i in dependence upon the signal ($s_j$) appearing at the input terminal and upon the element transfer function $A_{ij}$;

(d) a plurality M of threshold means, each threshold means (i) coupled to the output of one of said summing means (i) and adapted to produce an output ($p_i$) whenever the output signal ($p'_i$) produced by the respective summing means exceeds a given threshold value ($\theta_{pi}$), whereby the output P represented by the respective output signals $p_1, p_2 \ldots p_i \ldots p_M$ of said threshold means provide a separation of the patterns represented by said input signals $s_1, s_2, \ldots s_j \ldots s_N$ into classes.

2. A system as defined in claim 1, further comprising a Nestor adaptive module connected to receive the output signals $p_1, p_2, \ldots p_i \ldots p_M$ of said threshold means for producing an output R represented by respective output signals $r_i, r_2 \ldots r_l \ldots r_k$.

3. A system as defined in claim 1, wherein each of said threshold means include means for modifying the respective output signal $p'_i$ of said summing means with a respective chosen factor, and means for comparing the modified output with said threshold value and producing said output ($p_i$) in response thereto.

4. A system as defined in claim 3, wherein each of said signal modifying means is a scalar multiplying means for multiplying said output signal $p'_i$ by a respective scalar factor $\lambda_i$.

5. A system as defined in claim 4, further comprising means for selectively adjusting said scalar factor $\lambda_i$, when in a training mode, in dependence upon whether an incoming pattern is correctly or incorrectly identified by production of the output $p_i$ of the associated threshold means.

6. A system as defined in claim 5, wherein said scalar factor adjusting means comprises means for reducing the scalar factor $\lambda_i$ when an incoming pattern is incorrectly identified with a prototype by the threshold means with which that particular factor $\lambda_i$ is associated.

7. A system as defined in claim 6, wherein said scalar factor reducing means decrements said scalar factor by a prescribed amount each time an incoming pattern is incorrectly identified.

8. A system as defined in any one of claims 4–7, further comprising means for setting each scalar factor $\lambda_i$ to a maximum value $\lambda°_i$, thereby to associate committed prototypes with the scalar factors at their maximum values.

9. A system as defined in claim 1, further comprising means for selectively adjusting the threshold value $\theta_{pi}$ of a threshold means, when in a training mode, in dependence upon whether an incoming pattern is correctly or incorrectly identified by production of the output $p_i$ of that threshold means.

10. A system as defined in claim 9, wherein said threshold value adjusting means comprises means for increasing the threshold value $\theta_{pi}$ when an incoming pattern is incorrectly identified with a prototype by the threshold means with which that particular threshold value $\theta_{pi}$ is associated.

11. A system as defined in either one of claims 9 and 10, further comprising means for setting each threshold value $\theta_{pi}$ to a minimum value $\theta°_{pi}$, thereby to commence training with minimum threshold values.

12. A system as defined in any one of claims 1–10, wherein said threshold means is a trigger circuit which is actuated in response to an input thereto of at least said given threshold value.

13. A system as defined in any one of claims 1–10, further comprising class identifying means responsive to the output signals $p_1, p_2, \ldots p_l \ldots p_M$ of said threshold means for producing an output R, represented by respective output signals $r_1, r_2 \ldots r_l \ldots r_k$, indicative of the particular class of each particular pattern presented to the system.

14. A system as defined in claim 13, wherein said class identifying means comprises a plurality K of OR circuits, there being at least one OR circuit for each class to be identified, each OR circuit being connected to receive those output signals $p_i$ associated with a particular class so as to produce an output signal $r_l$ indicative of said class upon receipt of one or more said output signals $p_i$.

15. A system as defined in claim 13, wherein said class identifying means comprises:

(a) a plurality of class output means, each of said last-named means being selected to produce outputs indicating events of a single class;
(b) means respectively associated with each of said class output means for selectively activating each of said class output means; and
(c) means responsive to the concurrent activation of a selective activating means and outputs to be produced from the activated class output means.

16. A system as defined in claim 15, wherein each of said class output means is an OR circuit.

17. A system as defined in claim 15 wherein said class identifying means further includes:

(d) means respectively associated with said class output means and actuated in response to the production of an output from said selected class output means for enabling the switching into activation of said class output means without the operation of its associated activating means, whereby said last named class output means can thereafter produce an output in the absence of activation of its associated activating means;
(e) means responsive to the occurrence of outputs from said threshold means not intended as outputs from a currently activated class output means, and outputable from a class output means switchable into activation because of the prior actuation of the enabling means for producing an output from said class output means; and
(f) means responsive to said output from said class output means for selectively feeding back said output to those modifying means whose associated threshold means had produced said not intended outputs to change the value of the modifying factor in those modifying means.

18. A system as defined in claim 17, wherein each of said class output means is an OR circuit.

19. A system as defined in claim 17, wherein said means for causing the outputs from an activated class output means includes a three-input AND circuit while enabled by the concurrent appearance of signals at two of its inputs, the selective activating means being applied to first of its inputs, the output of a threshold means being applied to a second of its inputs, the output of said AND circuit being applied as an input to a said class output means.

20. A system as defined in claim 19, wherein said switching enabling means includes a bistable circuit which is switched to its set state upon the enabling, i.e. the production of an output from said AND circuit, the set output of said circuit being applied to the third of the inputs of said AND circuit.

21. A system as defined in claim 1, wherein the output of a junction element equals the product of its transfer function $A_{ij}$ and the signal $s_j$ applied thereto.

22. A system as defined in any one of claims 1, 10 and 21, further comprising means for modifying the transfer function $A_{ij}$ of at least one of said junction elements, when in a training mode, in dependence upon the incoming signal $s_j$ applied thereto and the output signal $p'_i$ of the summing means i with which said junction element is associated.

23. A system as defined in claim 22, wherein said transfer function modifying means is operative to modify all of said transfer functions.

24. A system as defined in claim 22, wherein said transfer function modifying means modifies the transfer function $A_{ij}$ in accordance with the formula:

$$A_{ij}(t) = \gamma A_{ij}(t-1) + \eta s_j p'_i$$

where $A_{ij}(t)$ is the new transfer function, $A_{ij}(t-1)$ is the previous transfer function prior to this modification, $\gamma$ is a decay constant in the range $0 \leq \gamma \leq 1$, and $\eta$ is an adjustable learning parameter.

25. A system as defined in claim 22, wherein said transfer function modifying means comprises means for feeding back the output $p'_i$ of each summing means to the junction elements associated with that summing means.

26. A system as defined in claim 22, further comprising an output bank R, including:
   (e) a plurality M of second input terminals, each such terminal (l) adapted to receive one of the M output signals ($p_i$);
   (f) a plurality K of summing means, each summing means (k) having M inputs and an output and being operative to provide a signal ($r'k$) at its output representing the sum of the signal representations applied to its inputs; and
   (g) a plurality M X K of junction elements, each junction element (kl) coupling one of said second input terminals (l) with one summing means (k) and providing a transfer of information from the respective second input terminal l to the respective summing means k in dependence upon the signal ($p_l$) appearing at the input terminal and upon the element transfer function $B_{kl}$.

27. A system as defined in claim 26, further comprising means for modifying the transfer function $B_{kl}$ of at least one of the junction elements of the output bank R, when in a training mode, in dependence upon the incoming signal $p_l$ applied thereto and the output signal $r_k$ of the summing means k with which said junction element is associated.

28. A system as defined in any one of claims 1, 10, 21 and 24, further comprising means for modifying the transfer function element $A_{ij}$ of at least one of said junction elements, when in the training mode, in dependence upon the incoming signal $s_j$ applied thereto and a unit vector of the prototype bank $p^i$, where the $j^{th}$ component of $p^i$, $p_j^i$, is $$p_j^i = 0 \text{ for } j \neq i$$
$$= 1 \text{ for } j = i$$

whereby $\delta A_{ij} = p_j^i s_j$.

* * * * *